United States Patent
Harrison et al.

(10) Patent No.: US 6,796,418 B1
(45) Date of Patent: Sep. 28, 2004

(54) ADDITION OF INTERMEDIATE SUPPORTS FOR SPIRAL CONVEYORS

(75) Inventors: James J. Harrison, Bernville, PA (US); William J. Werner, Bedford, OH (US)

(73) Assignee: KVP Corporation, Reading, PA (US)

( * ) Notice: Subject to any disclaimer, the term of this patent is extended or adjusted under 35 U.S.C. 154(b) by 0 days.

(21) Appl. No.: 10/607,126

(22) Filed: Jun. 26, 2003

(51) Int. Cl.$^7$ .......................... B65G 13/02; B65G 21/00
(52) U.S. Cl. ..................................... 198/778; 198/861.1
(58) Field of Search .............................. 198/778, 860.1, 198/860.2, 861.1

(56) References Cited

U.S. PATENT DOCUMENTS

| | | | |
|---|---|---|---|
| 3,260,350 A | * 7/1966 | Martin | 198/602 |
| 3,826,352 A | 7/1974 | Van Zon et al. | |
| 3,857,476 A | * 12/1974 | Heifetz et al. | 198/778 |
| 4,013,167 A | * 3/1977 | Bourgeois | 198/860.2 |
| 4,325,480 A | 4/1982 | Butt | |
| 4,901,844 A | 2/1990 | Palmaer et al. | |
| 4,932,516 A | 6/1990 | Andersson | |
| 5,111,929 A | 5/1992 | Pierick et al. | |
| 5,186,314 A | 2/1993 | Clopton | |
| 5,310,045 A | * 5/1994 | Palmaer et al. | 198/778 |
| 5,328,020 A | 7/1994 | Clopton | |
| 5,454,467 A | * 10/1995 | Lago | 198/831 |
| 5,584,377 A | * 12/1996 | Lago | 198/841 |
| 5,788,056 A | 8/1998 | Clopton | |
| 5,803,687 A | 9/1998 | Ledingham | |
| 6,296,111 B1 | 10/2001 | Mekanik et al. | |
| 6,484,379 B2 | 11/2002 | Palmaer | |
| 6,523,679 B1 | 2/2003 | Manchester | |
| 6,533,108 B1 | 3/2003 | Ledingham | |
| 6,666,322 B2 | * 12/2003 | Biondi et al. | 198/347.1 |

* cited by examiner

*Primary Examiner*—Douglas Hess
(74) *Attorney, Agent, or Firm*—Thomas N. Freiburger

(57) ABSTRACT

A helical or "spiral" conveyor belt system is retrofitted with further belt supports, added between existing belt supports, when needed for heavier loading, preferably without removing the belt from the spiral support structure. The additional support apparatus includes a series of snap-on plastic brackets, to be snapped over the cantilevered bars that extend horizontally inwardly at intervals to support the belt. These brackets form channels within which a set of metal rail members are held, the rail members being in sections securable together around the helical path. A U-shaped wear strip, preferably continuous, is placed down over the metal rails after assembly. This rail addition can be accomplished without removal of the belt, which can be lifted in place sufficiently to assemble the intermediate support components.

22 Claims, 7 Drawing Sheets

PRICK ART

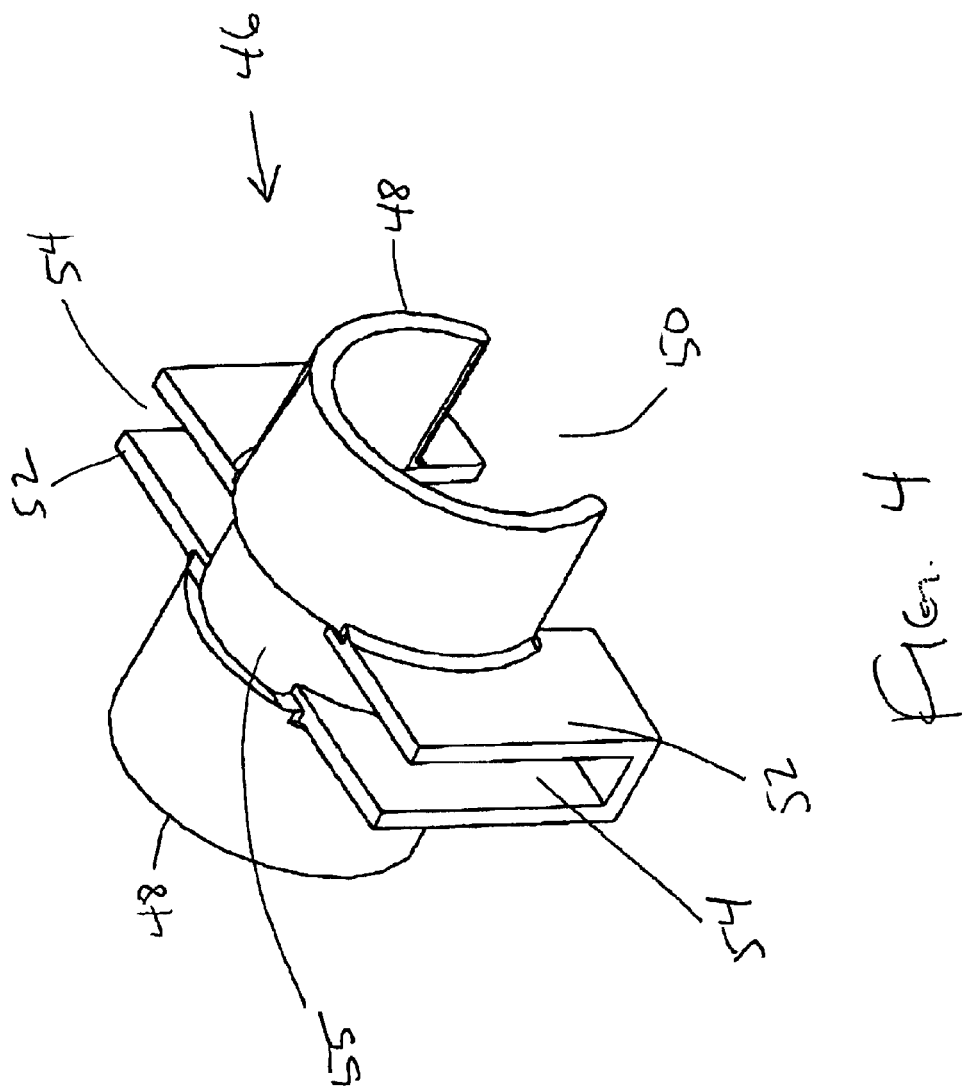

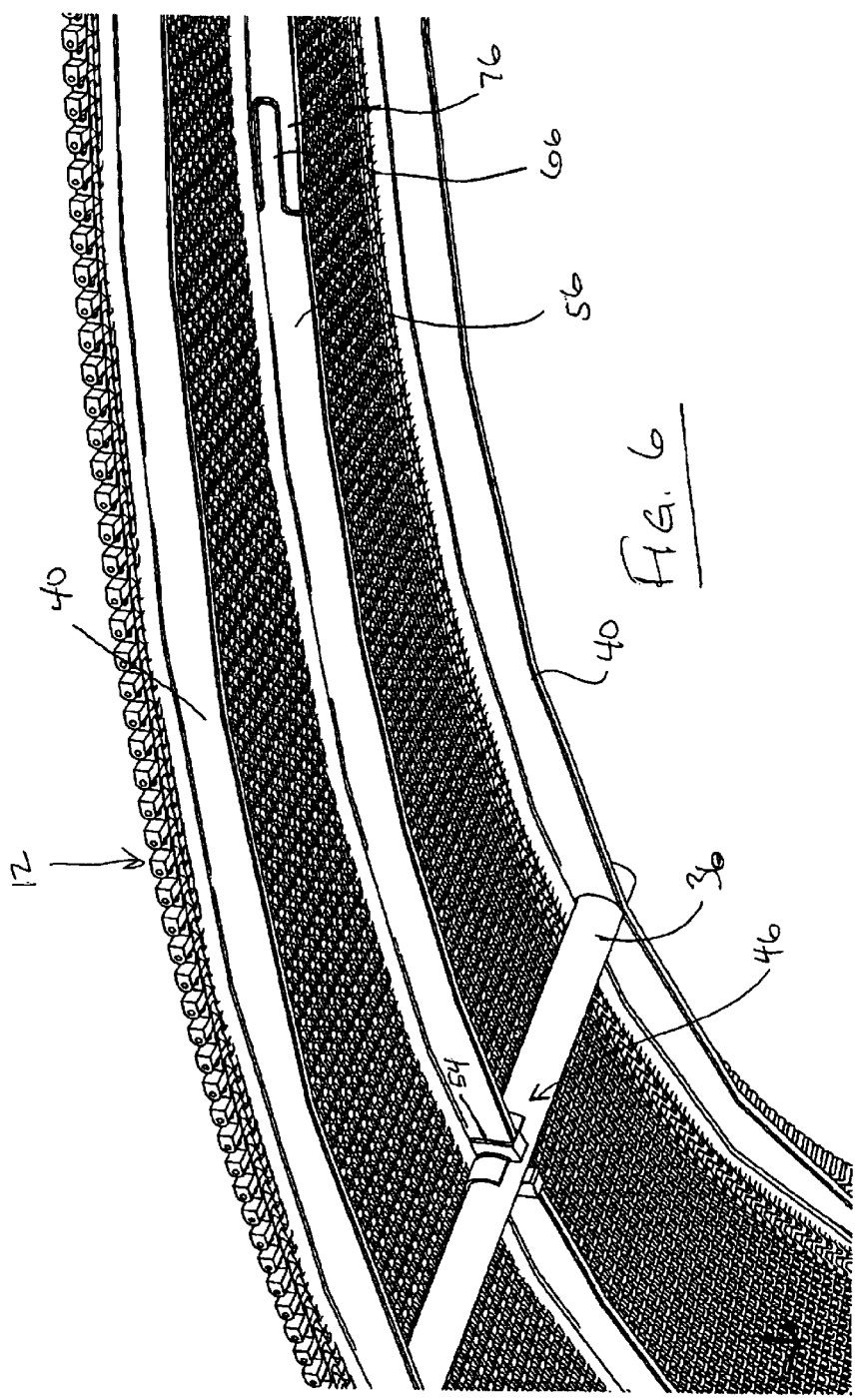

ADDITION OF INTERMEDIATE SUPPORTS FOR SPIRAL CONVEYORS

BACKGROUND OF THE INVENTION

This invention concerns conveyor belts, especially helical, so-called spiral conveyor belts, and embraces a method and apparatus for adding one or more intermediate support rails to an existing spiral conveyor belt system with or without removal of the belt from the existing support apparatus, or the disassembly of the spiral conveyor belt system.

Spiral conveyor belts have been in increasing use in various industries, particularly where a somewhat lengthy dwell time in a certain area or in a certain environment is needed. These include plastic modular conveyor belt systems, such as shown in U.S. Pat. Nos. 4,901,844 and 6,484,379, used for many purposes, but very commonly for transporting food articles. Bakery goods, for example, are often carried on plastic spiral conveyor belts, giving a desired dwell time for rising or for baking. These belts, however, particularly plastic spiral conveyor belts, are increasingly being used for other, non-food applications.

Often the belts are subjected to increased loading, sometimes across a wide spiral belt, such as 30 inches or more in width. Support for a spiral belt typically is provided by structure just outside the outer edge of the belt tiers, such as columns spaced around the circumference of the helical belt, these columns supporting cantilevered rods extending inwardly under the belt at intervals forming a helical path.

Often a belt subjected to heavier than usual loading needs additional support under the belt. Typically, metal spiral belts run on two parallel support rails, capped with wear strip, relying on the inherent rigidity of the metal structure and metal rods to prevent the belt from sagging in the middle under load. Modular plastic spiral belts typically use plastic rods and lack the rigidity of metal. Consequently, plastic belts in particular can sag in the middle under a product load. One of two things is presently done to alleviate the sagging problem: the original spiral conveyor manufacturer is contracted to install a permanent third support rail (very expensive and time-consuming), or steel rods are installed in the belt either every row or at determined spacing (adds weight to the belt and defeats much of the value of the plastic belt). Often only two wear strip support rails are provided, one near the inner edge of the belt and one near the outer edge. With increased load near the middle of the belt, there is often a need for further support rails with wear strips, at one or two locations intermediate to the outer support rails. Once the belt has been removed, and a substantial portion of the system has been dismantled, a large, time-consuming and expensive undertaking, a technician secures further support rails onto the cantilevered support rods, using the same securing hardware as with the existing support rails. When this has been accomplished, the belt must be replaced on the helical support path and much of the system must be reassembled.

There has been a need for a technique and accompanying apparatus which would enable additional rail supports to be added to a spiral conveyor belt support structure quickly and less expensively than installing a third rail in the same manner as the original rail installation. This is an object of the present invention as described below.

The following patents show belt support structures having some pertinence to the invention: U.S. Pat. Nos. 6,533,108, 6,523,679, 6,296,111, 5,803,687, 5,788,056, 5,328,020, 5,186,314, 5,111,929, 4,932,516, 4,325,480, 4,013,167 and 3,826,352. Of these patents, Ledingham U.S. Pat. No. 6,533,108 shows use of a clip to secure a wear strip in a conveyor system. Manchester U.S. Pat. No. 6,523,679 shows wear strips that can be installed and removed without the use of tools in a conveyor system. U.S. Pat. No. 5,803,687 of Ledingham shows details of a clip used to hold a guide rail of a conveyor system. Andersson U.S. Pat. No. 4,932,516 discloses retrofitting of longitudinal support slats in a trough shaped conveyor belt.

SUMMARY OF THE INVENTION

The invention presents a very cost-effective, fast procedure to add further support rails to an existing spiral system. The invention can be applied to either metal belts or plastic belts, although in general its application is more critical in plastic belts with plastic connecting rods not designed to carry a load over a wide span.

The additional support apparatus includes a series of snap-on plastic brackets, to be snapped over existing cantilevered bars that extend horizontally inwardly at intervals to support the belt. These brackets, identified as cantilever clamp flanges or cantilever rail supports herein, form channels which engage with rail members that are in sections securable together around the helical path, to adjustable length. A U-shaped wear strip, preferably continuous, is placed down over the rails after they are assembled and supported by the plastic brackets on the cantilevered rods. This assembly can be accomplished without removal of the belt, which can be lifted in place sufficiently to assemble the intermediate support components. It can also be added prior to a new modular plastic belt installation, often replacing a metal conveyor belt.

In one broad aspect the invention encompasses addition of an intermediate rail in a spiral belt system by use of cantilever rail supports engaged on cantilevered support bars, with the new rail secured to the rail supports.

It is thus among the objects of the invention to provide a method and means for efficient addition of further, intermediate support rails to a spiral conveyor belt system, with or without removal of the belt or disassembly of the spiral system. This and other objects, advantages and features of the invention will be apparent from the following description, considered along with the accompanying drawings.

DESCRIPTION OF PREFERRED EMBODIMENTS

Figure 1:
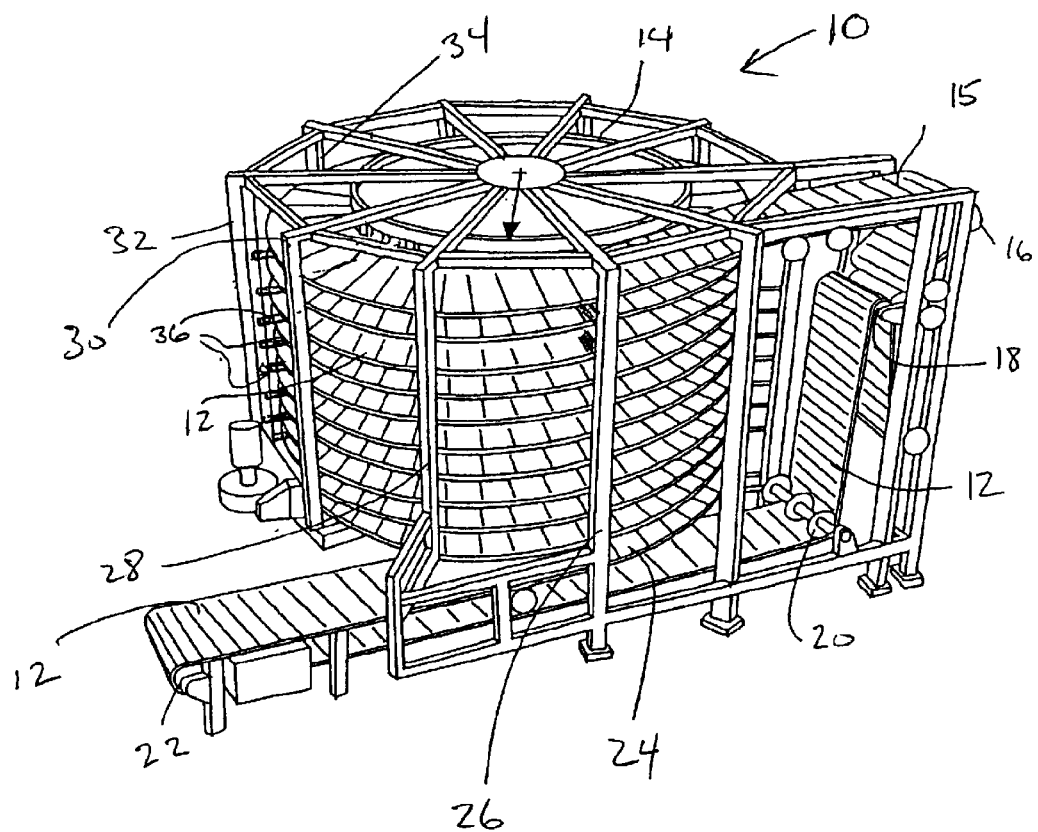
FIG. 1 is a perspective view showing a spiral conveyor belt system, generally of the type with which this invention is concerned.

FIG. 1 shows in perspective a spiral conveyor belt system 10 of somewhat typical construction. The system 10 has a conveyor belt 12, which may be metal but more often will be a plastic modular conveyor belt for the present invention. A driving cage 14 is positioned centrally in the helical portion of the system, for frictionally engaging the inner sides of the spiral conveyor belt 12 in its helical path through the system. The belt departs from the multi-tiered section of the belt system at 15 (although the belt could be driven in the other direction if desired), and passes over various rollers 16, 18, 20, 22, etc. before returning to the helical path, generally at 24, for again being driven through the multiple tiers. Products can be offloaded at 15 and on loaded at the roller 22.

Support structure for the spiral conveyor belt is provided by uprights or columns 26, 28, 30, 32, 34, etc. positioned preferably at generally equal angular spacing around the outer edge of the helically traveling conveyor belt 12.

Figure 2:
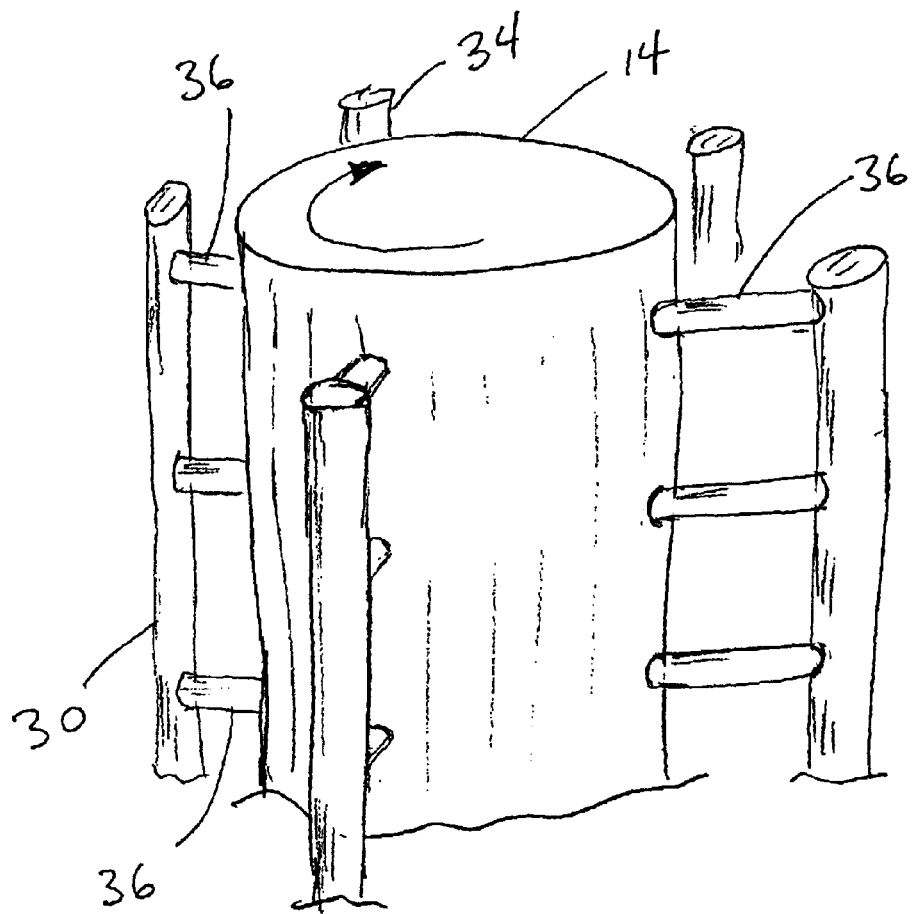
FIG. 2 is a schematic perspective view, showing typical support structure in a spiral conveyor belt system.

These external supports provide support for the conveyor belt 12 via cantilevered generally horizontal bars 36 extending inwardly from the columns or posts 28, 30, 32, etc. As indicated in FIG. 1 showing only some of the cantilevered support bars 36, these support bars 36 extend under each tier of the helical conveyor belt assembly. This is shown in the schematic view of FIG. 2, where only some of the support columns 30, 34, etc. are shown and where the horizontal cantilevered bars 36 are schematically shown, omitting several tiers. The driving cage is shown at 14, and as illustrated, the cantilever bars 36 reach very nearly to the exterior of the driving cage.

Figure 3:
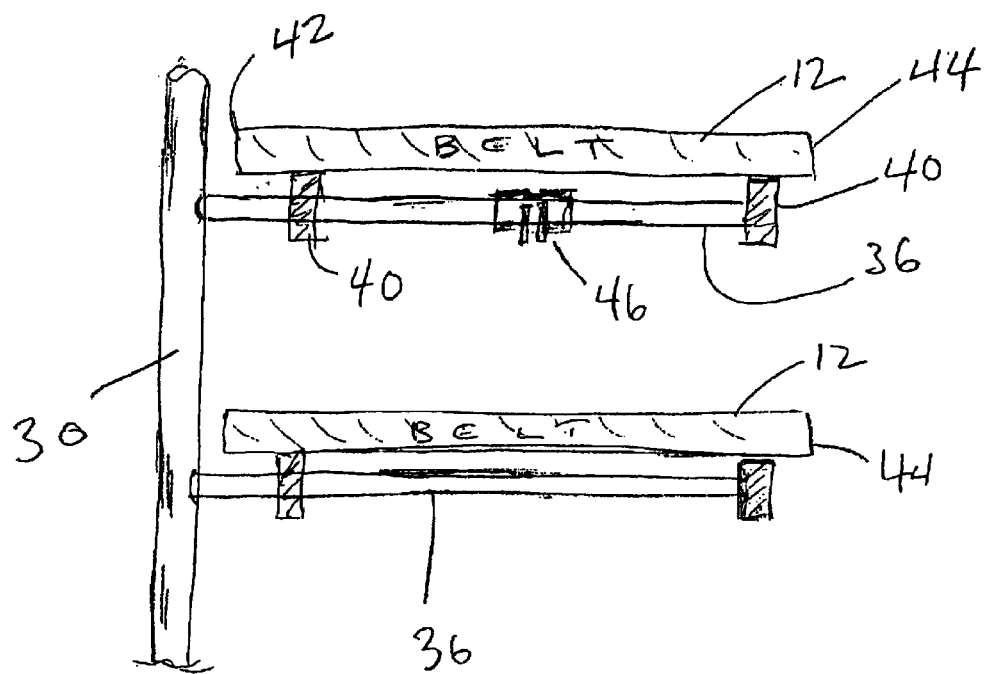
FIG. 3 is a sectional view showing several tiers of a spiral conveyor belt system, and the manner of their support.

FIG. 3 shows in cross section one of the columns 30 with several tiers of cantilever support bars 36 extending therefrom, and with several tiers of the conveyor belt 12 shown supported on connected apparatus. The support bars normally are cylindrical or rectangular in cross section. Support rails 40 are secured to the cantilevered bars 36, by any appropriate means, such as fasteners. Sometimes the bar passes through a hole in the rail, or welding is used, or both. The existing support rails 40 typically are two in number, and are positioned somewhat inboard from each of the outer edge 42 and the inner edge 44 of the belt, as described above. In FIG. 3 the driving cage or tower 14 (not shown) would be on the right, near the inner edge 44 of the belt. The helical support rails 40 have wear strips on them (not specifically shown) for engaging against the bottom side of the belt 12, whether the belt is metal or plastic.

Figure 5:
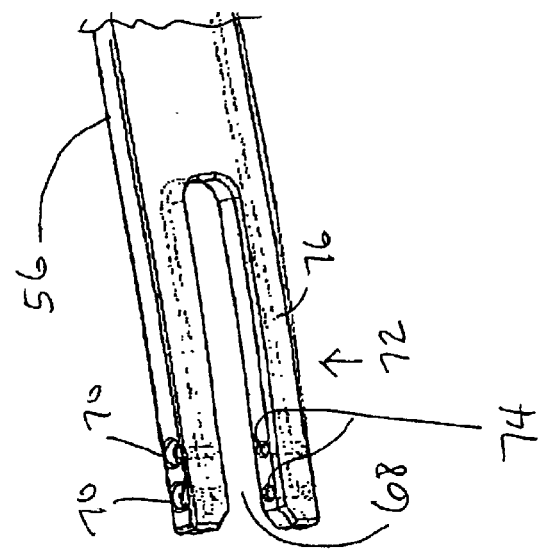
FIG. 5 is a perspective view showing parts of two rail sections forming a part of the apparatus for adding further rails to an existing system.
Figure 5:
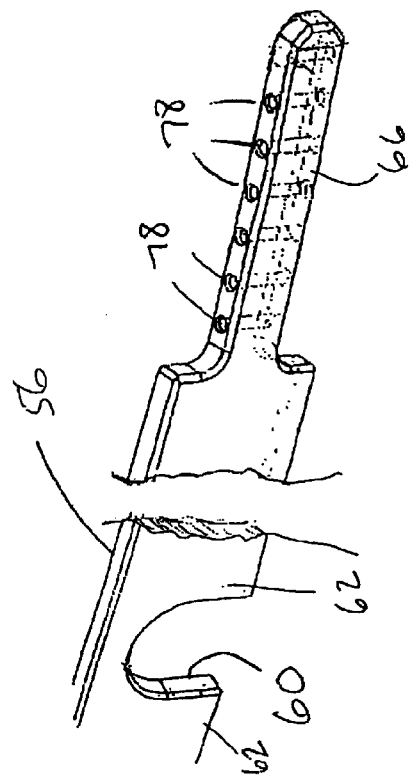
Figure 4:
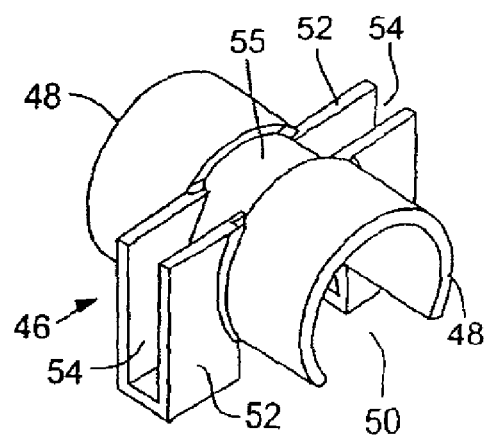
FIG. 4 is a perspective view showing a component provided in accordance with the invention, for adding further intermediate rail supports to an existing spiral conveyor belt system.
Figure 6:
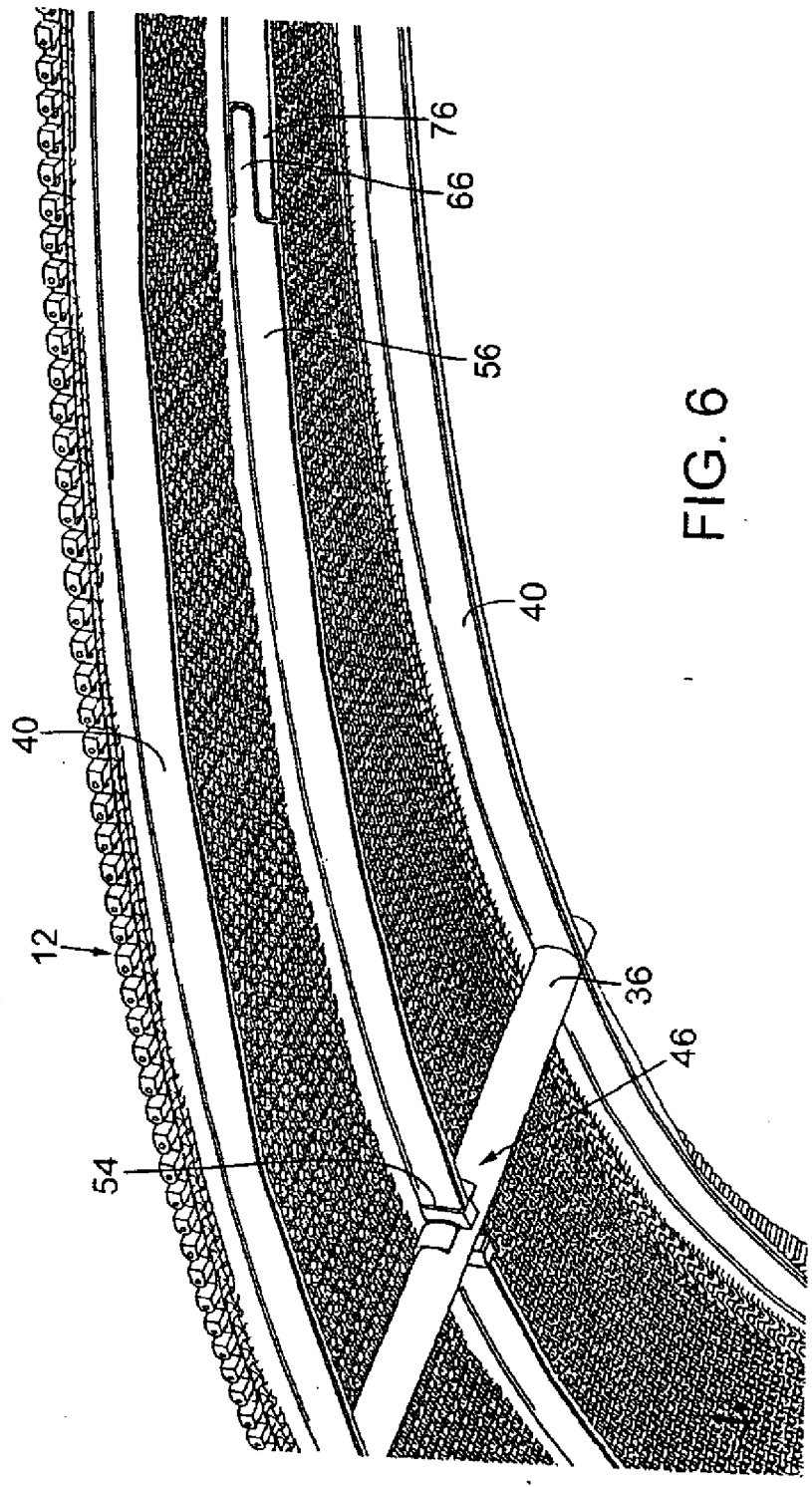
FIG. 6 is a perspective view showing the underside of a portion of a single tier of a spiral conveyor belt system, showing a rail added by the method and apparatus of the invention.

FIGS. 4, 5 and 6 show components of the invention, for adding further support rails to an existing spiral conveyor belt, which can be without removing the belt from the assembly if needed. FIG. 4 shows a plastic cantilever clamp flange member or cantilever rail support member 46 that is configured to snap down over a cantilever support bar such as the support bars 36 shown in FIGS. 1–3. As illustrated, this plastic member comprises a generally C-shaped or U-shaped section 48, depending on the shape of the bar to which the member is to be attached. The section 48 has an open bottom side 50, and integrally formed with this section are a pair of channel structures 52, extending in fore and aft directions. In addition, the central section may include a small recessed arc 55, generally aligned with the channel structures 52. The channel structures, which form open channels at 54, are configured to receive rail sections 56, shown in FIG. 5, to be added into the spiral conveyor belt system. Specifically, some or all of the rails include at least one cutout or recess 60 extending up from its bottom side as shown in FIG. 5, and this recess fits down over the cantilever clamp flange 46 preferably in a snug fit. As can be envisioned from FIGS. 4 and 5, this recess 60 straddles the cantilever clamp flange such that portions 62 of the rail section fore and aft of the recess 60 slide down into the channels 54 of the clamp flange 46. The center recess 55 of the clamp flange receives a center portion of the arch of the rail cutout 60. This assembly is shown in FIG. 6, for one of the rail sections.

FIG. 6 shows cylindrical cantilever bars 36, although these can be rectangular in cross section. FIG. 6 also shows the case where the existing rails 40 have holes that fit over the bars 36; they can be fixed thereon by welding. The new rail 56 is shown in FIG. 6 engaged over the clamp flange or rail support 46, engaged in the channels 54. The central section 48 of the clamp flange is C-shaped, snapped over the cylindrical bar 36, but it could be U-shaped and engaged over a rectangular (or other shape) bar.

The cantilever clamp flange or bracket 46 may be made from any of a number of plastic materials or composites, or it could be metal, so long as it is deformable to allow the cylindrical central portion 48 to snap down over, and engage tightly against, a cantilever support bar 36. Note that the portion 48 may be generally U-shaped for the case where the bars 36 are rectangular in cross section, and the rail cutouts 60 may then be more rectangular in shape. This is discussed below with reference to FIG. 8. A cantilever clamp flange 46 is shown snapped over a support bar in FIG. 3, without a rail section having yet been put in place. Typical plastics which may be used for this component are acetal, polypropylene, nylon and/or other modified plastics.

In a preferred form the channels 54 of the clamp flanges are angled slightly in extending fore and aft of the center section 48. The angle may be, for example, about ½° to 5°, more preferably about 1° to 2°. When the rail sections are assembled onto the clamp flanges this angle causes the clamp flange to deform in such a way as to firmly grip the cantilever bar 36.

The rail sections 56 shown in FIGS. 5 and 6 may be metal, plastic or composite material. These rails are somewhat elongated in cross section, substantially greater in height than in thickness as shown in FIG. 5. Rail sections can be produced in a number of different sizes, depending on the load specifications for a spiral conveyor belt system. Dimensions depend as well on the materials used for the rail sections.

The length in which the rail sections 56 are produced can also vary. In the rails shown there is a single U-shaped cutout or recess 60, approximately in the middle of the rail section, and thus there would be one rail section for each support post 30, 32, 34, etc. in the spiral conveyor support system. If there are, for example, eight such columns equally spaced, each rail in this exemplary embodiment would extend through ⅛ of a circle, i.e. 45° of arc, and its length would be defined by that arc and the size of the conveyor belt system. However, it should be appreciated that each rail section 56 can have more than one such recess or cutout 60 if desired, and could be of greater length. This is somewhat limited by convenience in assembly of the rail sections, which in a preferred method involves temporarily lifting each tier of belt when a rail section is to be installed, then securing the rail section to a succeeding section, and so on.

One means of connection of a rail section 56 to a succeeding rail section is shown in FIG. 5. This is a form of tongue-in-groove arrangement, in which one end of a rail section 56 has a narrowed projection 66, essentially a reduced-height finger extending from the one end of the rail section. At the opposite end of each rail section is a groove or slot 68 which receives the tongue or finger 66, to a depth as needed, providing for adjustment of length of the assembled support rail during assembly. Note that the field installation is adjustable by movement of the plastic cantilever clamp flange 46 in/out, and/or by adjusting the interlock length of the rails at these connections.

As seen in FIG. 5, several holes 70 are provided in the forked rail end 72 having the channel or slot 68. These holes 70, extending generally vertical and transverse to the length of the rail section, are aligned with holes 74 in a lower prong 76 of this forked end. Fasteners (not shown) are inserted down through the holes 70, through corresponding pairs of holes 78 in the tongue 66 of the other rail section, and into the bores 74 to secure and interlock the two rail section ends together.

Figure 7:
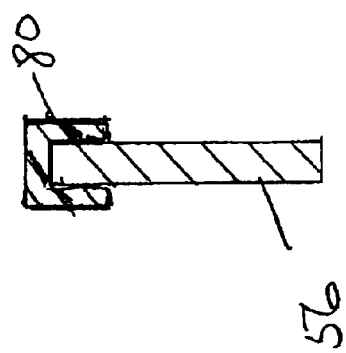
FIG. 7 is a sectional elevation view, seen in the direction of belt travel, showing an added support rail with a wear strip attached.
Figure 1:
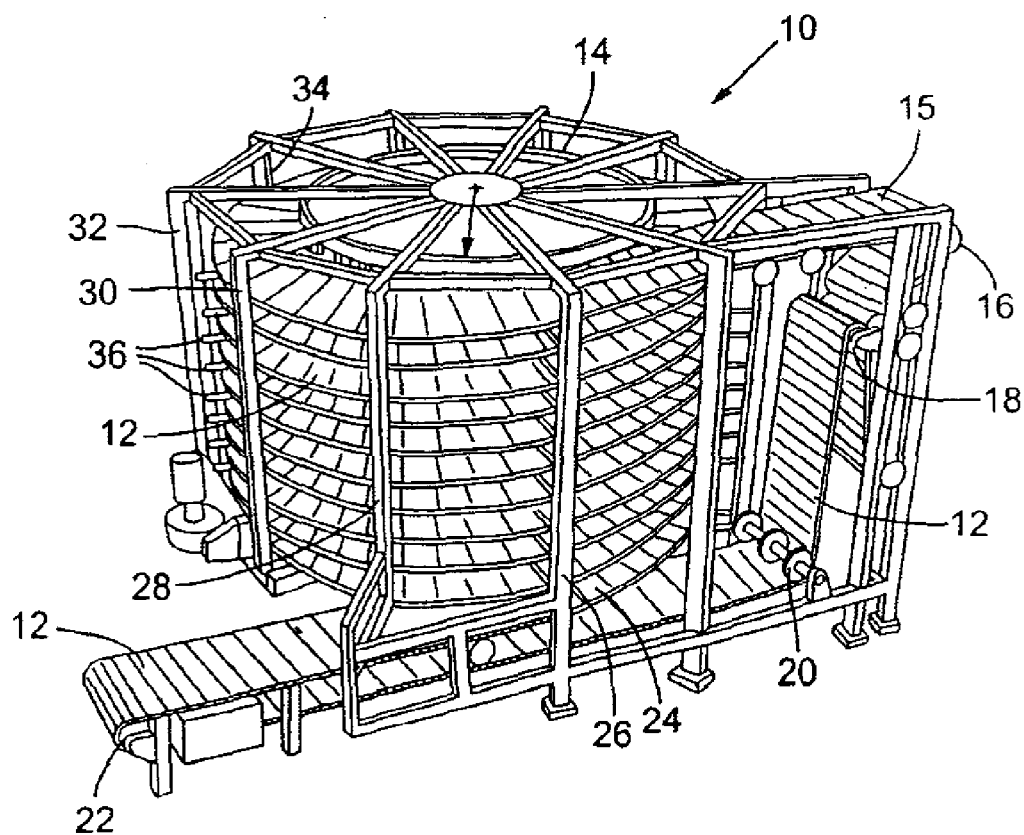
Figure 2:
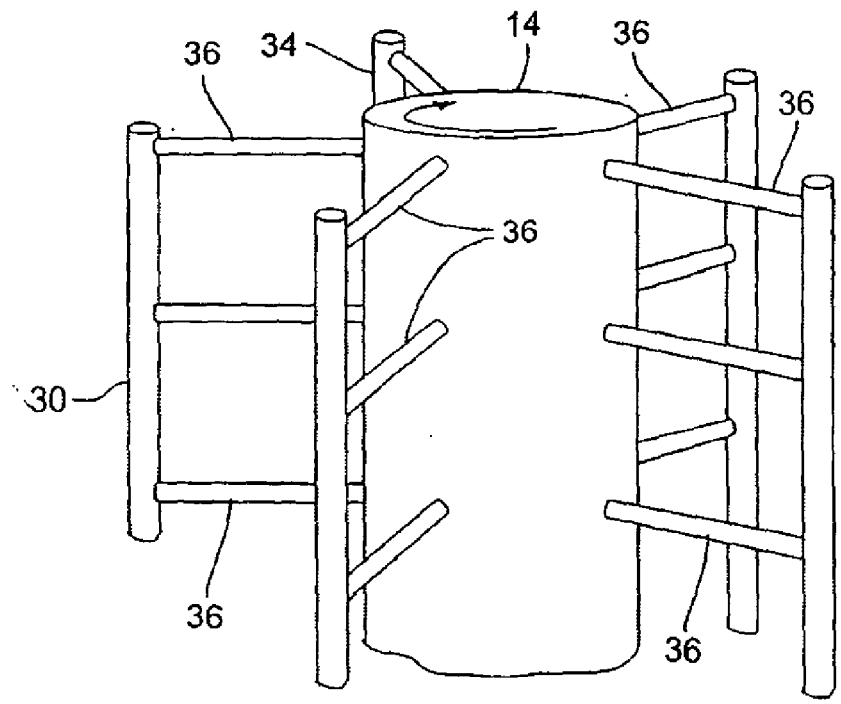
Figure 3:
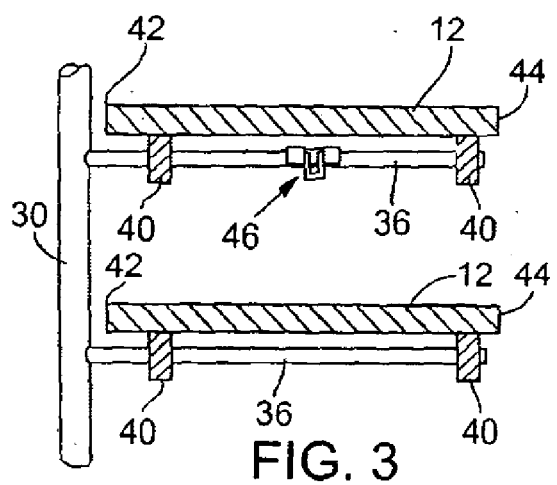

FIG. 7 is a simple schematic cross section showing a rail section 56, after assembly with other rail sections, engaged by a U-shaped wear strip 80. Once the rail sections have been assembled together to form a continuous support rail throughout the helix of the belt support arrangement, a preferably continuous such wear strip 80 is capped onto the top edge of the support rail as shown. The wear strip 80 is of a plastic material typically used for conveyor belt wear strips, and is molded in dimensions so as to tightly engage onto the top edge of the support rail.

Figure 8:
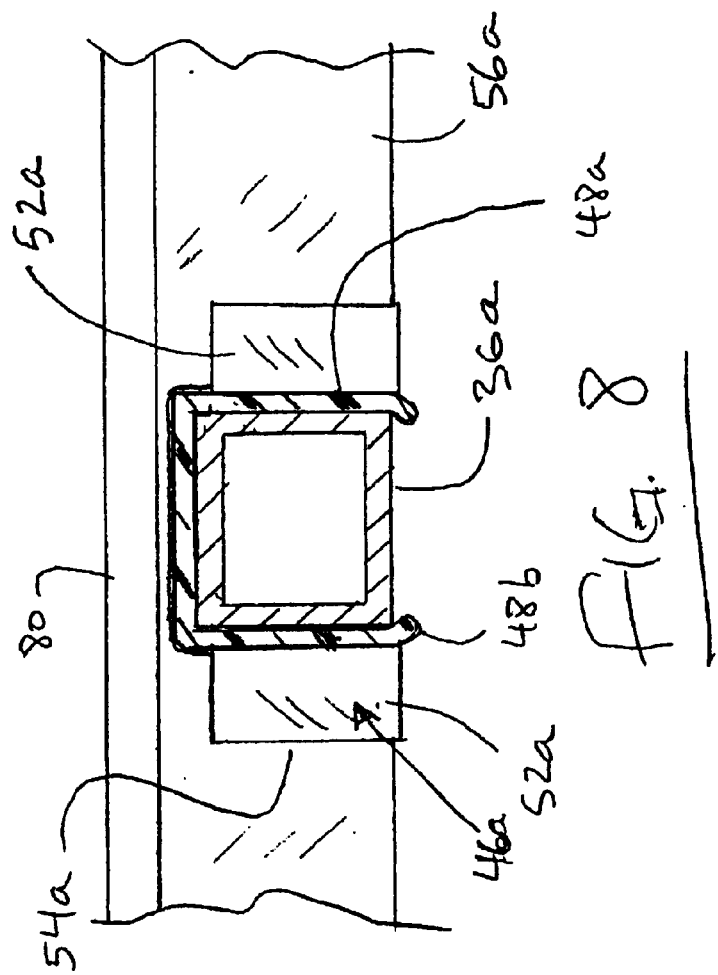
FIG. 8 is a cross sectional elevation view showing the system of the invention installed on rectangular existing cantilever supports.

FIG. 8 is an elevational cross section view showing the assembly of components of the invention in the case where the existing cantilevered generally horizontal bars 36a are not circular and cross section. In this case they are shown rectangular, which may be square. The cantilever rail supports 46a in this case have central bar-engaging sections 48a which are generally U-shaped in cross section, rather than C-shaped. As shown at 48b, these center sections 48a may include inwardly extending nubs or bends, which snap over the bottom edge of the existing rectangular bar 36a generally as shown. The cantilever rail supports 46a include channel flanges 52a similar to what is shown in FIG. 4, extending in both the fore and aft directions from the center section 48a and forming channels 54a which receive and provide seats for the rail section 56a. The rail section 56a in this case has a generally U-shaped cutout which is somewhat more squared at corners to sit down over the generally rectangular center section 48a, rather than having the more rounded U-shaped cutout 60 shown in FIG. 5. At the top of the rail section 56a is shown the U-shaped wear strip 80, similar to what is shown in FIG. 7.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A method for adding an intermediate support rail in a spiral conveyor belt system, for supporting a conveyor belt in its helical path where the conveyor belt rests on existing supports near the edges of the belt, the existing supports being secured to cantilevered generally horizontal rods or bars extending inwardly from peripheral support structure, comprising:

assembling onto the cantilevered horizontal support bars a series of cantilever clamp flanges, in a position along each cantilevered support bar between existing belt supports, assembling onto the clamp flanges a series of rail members, the rail members having means for assembly together end-to-end and the rail members having means for engagement with the cantilever clamp flanges, and including assembling the rail members together and to the clamp flanges, such that the rail members form a continuous rail following a helical path through the helical conveyor belt, and securing over the top of the assembled rail a wear strip, whereby additional support is provided for carrying relatively heavy loads on a spiral conveyor belt without requiring substantial disassembly of the spiral conveyor belt system.

2. The method of claim 1, wherein the cantilever clamp flanges comprise plastic members having a C-shaped or U-shaped snap-over central clamp structure for engaging on cantilevered support bars.

3. The method of claim 2, wherein each cantilever clamp flange further includes a channel at each of fore and aft positions on the clamp flange, and wherein the rail members include generally U-shaped recesses extending upwardly from the bottom edge of the rail member, and wherein the step of assembling the rail members onto the cantilever clamp flanges comprises engaging the U-shaped recesses of the rail members down over the cantilever clamp flanges such that the rail member at areas immediately fore and aft of the U-shaped recess slides into and engages within the channels on the cantilever clamp flange.

4. The method of claim 3, wherein the channels are angled slightly in extending fore and aft of the central clamp structure, causing the clamp flange to deform when the rail member is assembled into the channels such that the clamp flange firmly grips the cantilevered support bar.

5. The method of claim 1, wherein the rail members comprise rail sections having height substantially greater than width, and each having two ends, one end with a generally horizontal elongated slot and the other having a generally horizontal elongated projection narrowed in height, the narrowed projection forming a tongue and the slot forming a groove for end-to-end assembly of successive rail sections.

6. The method of claim 5, further including means for inserting a fastener to secure the projection and slot at a desired position, with the projection inserted a desired distance into the slot.

7. The method of claim 1, including temporarily lifting sections of the conveyor belt above the existing supports while said assembling and securing steps are performed, the method being performed without removing the conveyor belt from the existing belt supports.

8. The method of claim 1, wherein the cantilever clamp flanges are springably deformable and are snapped over the cantilevered support bars.

9. The method of claim 8, wherein the cantilever clamp flanges have a C-shaped snap-over clamp structure for engaging onto cylindrical cantilevered support bars.

10. The method of claim 8, wherein the cantilever clamp flanges have a U-shaped clamp structure for engaging onto generally rectangular cantilevered support bars.

11. The method of claim 1, wherein a metal conveyor belt is removed prior to assembly of the cantilever clamp flanges onto the cantilevered support bars, and after the wear strip is secured on the assembled rail, a plastic modular conveyor belt is assembled into the spiral conveyor belt system.

12. The method of claim 1, wherein the wear strip comprises an inverted U-shaped wear strip secured down over the top surface of the rail member.

13. A set of components for adding a further support rail in a spiral conveyor belt, where additional support is required between the edges of the spiral belt, comprising:

a series of cantilever clamp flanges, each having engagement means for engaging over an existing cantilevered support bar comprising one of many such support bars arranged at intervals and extending generally inwardly, arranged in a generally helical path for support of the existing conveyor belt, a series of rail members, each having means for engagement onto a cantilever clamp flange and each having means for connection with a successive rail member, and a wear strip adapted to fit down over the series of rail members when assembled together and supported by the clamp flanges, whereby one or more additional support rails can be added to an existing spiral conveyor belt system with or without dismantling the conveyor belt from the existing support apparatus.

14. The apparatus of claim 13, wherein each cantilever clamp flange comprises a plastic member having a generally C-shaped or U-shaped opening sized to deform and snap over an existing tubular cantilevered support bar.

15. The apparatus of claim 14, wherein the cantilever clamp flange includes fore and aft channels for engagement with a rail member, and wherein each rail member includes at least one recess generally in the shape of an inverted U and sized to slide down over the cantilever clamp flange and to engage with the fore and aft channels.

16. The apparatus of claim 15, wherein the rail members are of metal, plastic or composites.

17. The apparatus of claim 15, wherein the fore and aft channels on the cantilever clamp flanges are slightly angled relative to an axis of the C-shaped or U-shaped opening, at an angle such that when the rail members are assembled into the channels the clamp flanges deform to firmly grip the cantilevered support bars.

18. The apparatus of claim 13, wherein each rail member has two ends, with a tongue-and-groove interfit arrangement between one end of one rail section and the adjacent end of a succeeding rail section, by which a projection or tongue of the succeeding rail section is inserted into an elongated longitudinal slot of an adjacent rail section, to a desired and adjustable extent, with fastening means for securing the two rail sections together at such desired extent, whereby two adjacent rail sections can be assembled to accommodate a desired length within the helical path.

19. A method for adding an intermediate support rail in a spiral conveyor belt system, for supporting a conveyor belt in its helical path where the conveyor belt rests on existing supports near the edges of the belt, the existing supports being secured to cantilevered generally horizontal rods or bars extending inwardly from peripheral support structure, comprising:

assembling onto the cantilevered horizontal support bars a series of cantilever rail supports, in a position along each cantilevered support bar between existing belt supports, and assembling an intermediate support rail on the cantilever rail supports, whereby additional support is provided for carrying relatively heavy loads on a spiral conveyor belt.

20. The method of claim 19, including temporarily lifting sections of the conveyor belt above the existing supports while said assembling step is performed, the method being performed without removing the conveyor belt from the existing belt supports.

21. The method of claim 20, wherein the intermediate support rail is assembled into the conveyor belt system in sections.

22. The method of claim 21, wherein a rail section is assembled to each cantilever rail support, the rail section having an inverted U-shaped recess which slides down over and engages with the cantilever rail support.

* * * * *

UNITED STATES PATENT AND TRADEMARK OFFICE
CERTIFICATE OF CORRECTION

PATENT NO. : 6,796,418 B1
DATED : September 28, 2004
INVENTOR(S) : Harrison et al.

It is certified that error appears in the above-identified patent and that said Letters Patent is hereby corrected as shown below:

Drawing sheets, consiting of Fig. 1 thru Fig. 8, should be deleted and replaced with the drawing sheets, consisting of Fig. 1 thru Fig. 8, as shown on the attached pages.

Signed and Sealed this

First Day of March, 2005

JON W. DUDAS
*Director of the United States Patent and Trademark Office*

(12) United States Patent
Harrison et al.

(10) Patent No.: US 6,796,418 B1
(45) Date of Patent: Sep. 28, 2004

(54) ADDITION OF INTERMEDIATE SUPPORTS FOR SPIRAL CONVEYORS

(75) Inventors: James J. Harrison, Bernville, PA (US); William J. Werner, Bedford, OH (US)

(73) Assignee: KVP Corporation, Reading, PA (US)

( * ) Notice: Subject to any disclaimer, the term of this patent is extended or adjusted under 35 U.S.C. 154(b) by 0 days.

(21) Appl. No.: 10/607,126

(22) Filed: Jun. 26, 2003

(51) Int. Cl.7 .................. B65G 13/02; B65G 21/00
(52) U.S. Cl. ............................. 198/778; 198/861.1
(58) Field of Search ..................... 198/778, 860.1, 198/860.2, 861.1

(56) References Cited

U.S. PATENT DOCUMENTS

| | | | |
|---|---|---|---|
| 3,260,350 A | * | 7/1966 | Martin ................ 198/602 |
| 3,826,352 A | | 7/1974 | Van Zon et al. |
| 3,857,476 A | * | 12/1974 | Heifetz et al. ............ 198/778 |
| 4,013,167 A | * | 3/1977 | Bourgeois ............ 198/860.2 |
| 4,325,480 A | | 4/1982 | Butt |
| 4,901,844 A | | 2/1990 | Palmaer et al. |
| 4,932,516 A | | 6/1990 | Andersson |
| 5,111,929 A | | 5/1992 | Pierick et al. |
| 5,186,314 A | | 2/1993 | Clopton |
| 5,310,045 A | * | 5/1994 | Palmaer et al. ........... 198/778 |
| 5,328,020 A | | 7/1994 | Clopton |
| 5,454,467 A | * | 10/1995 | Lago ................. 198/831 |
| 5,584,377 A | * | 12/1996 | Lago ................. 198/841 |
| 5,788,056 A | | 8/1998 | Clopton |
| 5,803,687 A | | 9/1998 | Ledingham |
| 6,296,111 B1 | | 10/2001 | Mekanik et al. |
| 6,484,379 B2 | | 11/2002 | Palmaer |
| 6,523,679 B1 | | 2/2003 | Manchester |
| 6,533,108 B1 | | 3/2003 | Ledingham |
| 6,666,322 B2 | * | 12/2003 | Biondi et al. ........... 198/347.1 |

* cited by examiner

*Primary Examiner*—Douglas Hess
(74) *Attorney, Agent, or Firm*—Thomas N. Freiburger

(57) ABSTRACT

A helical or "spiral" conveyor belt system is retrofitted with further belt supports, added between existing belt supports, when needed for heavier loading, preferably without removing the belt from the spiral support structure. The additional support apparatus includes a series of snap-on plastic brackets, to be snapped over the cantilevered bars that extend horizontally inwardly at intervals to support the belt. These brackets form channels within which a set of metal rail members are held, the rail members being in sections securable together around the helical path. A U-shaped wear strip, preferably continuous, is placed down over the metal rails after assembly. This rail addition can be accomplished without removal of the belt, which can be lifted in place sufficiently to assemble the intermediate support components.

22 Claims, 7 Drawing Sheets

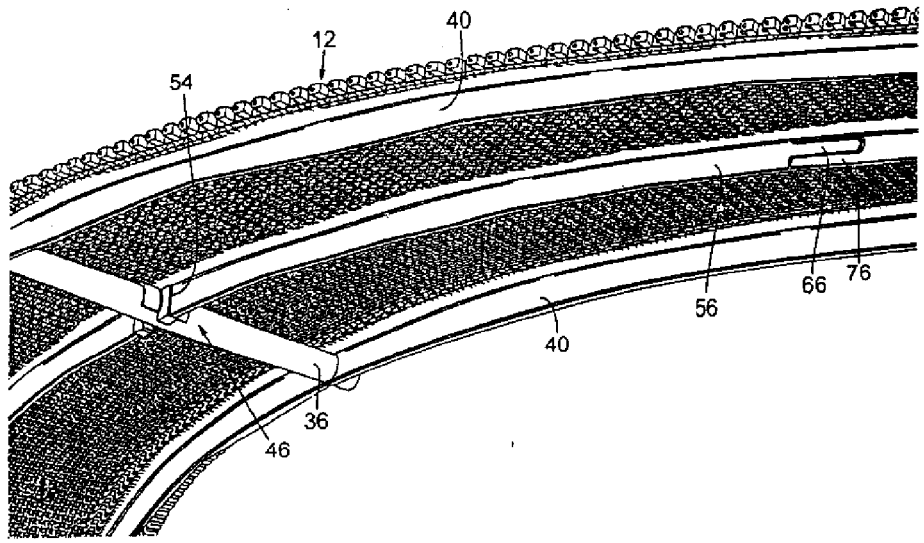

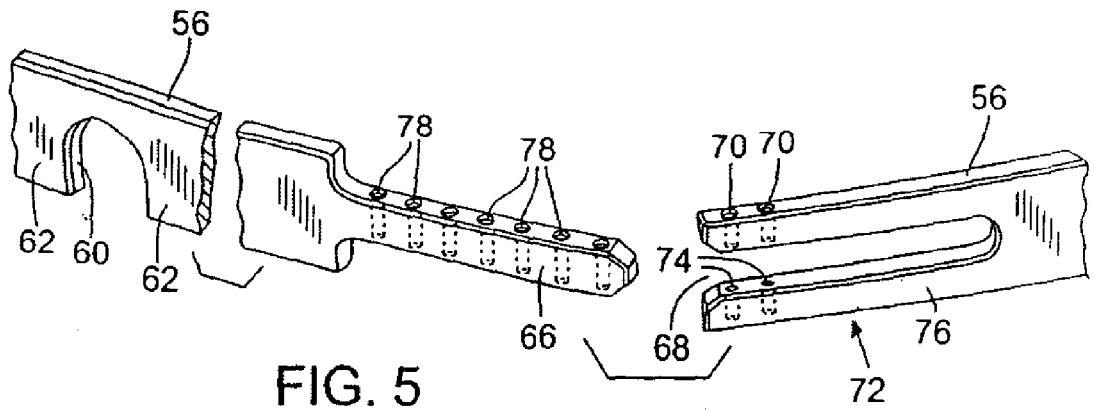
FIG. 5
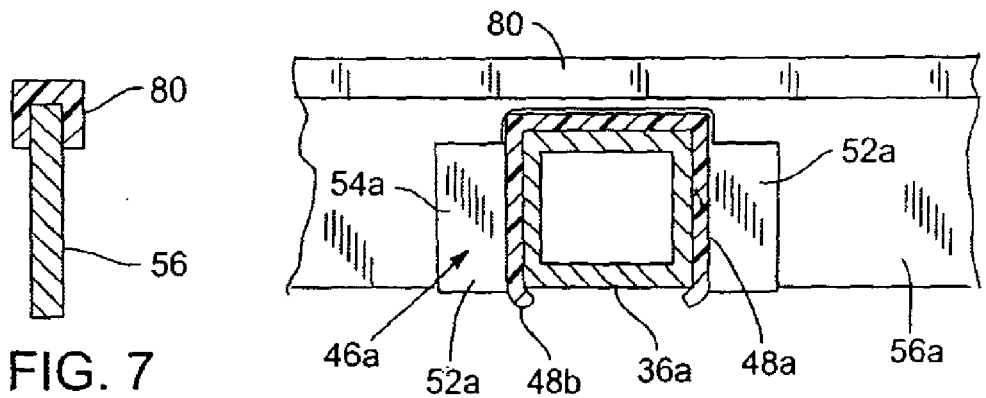
FIG. 7
FIG. 8